Jan. 25, 1938.  S. KAZANJIAN  2,106,606

SAFETY DEVICE AND VALVE THEREFOR

Filed May 21, 1936

INVENTOR
Souren Kazanjian
BY
ATTORNEY

Patented Jan. 25, 1938

2,106,606

UNITED STATES PATENT OFFICE 2,106,606

SAFETY DEVICE AND VALVE THEREFOR

Souren Kazanjian, Woodside, Long Island, N. Y.

Application May 21, 1936, Serial No. 80,960

2 Claims. (Cl. 251—138)

This invention relates to new and useful improvements in a safety device and valve therefor for use particularly on automobiles, airplanes, and the like.

The invention particularly relates to improvements in feelers or similar elements to be mounted on the airplane or other vehicles and adapted to be moved when engaged against foreign objects and adapted to control various mechanisms.

A further arrangement consists in adapting the feeler construction for association with a vehicle to control the sounding of an acoustic device and for taking pictures of the scene where the feelers are moved.

Still further the invention proposes the application of the improved feelers to an airplane arranged to extend wing portions thereof.

For further comprehension of the invention and of the objects and advantages thereof, reference will be had to the following description and accompanying drawing, and to the appended claims in which the various novel features of the invention are more particularly set forth.

In the accompanying drawing forming a material part of this disclosure:—

Figure 1:
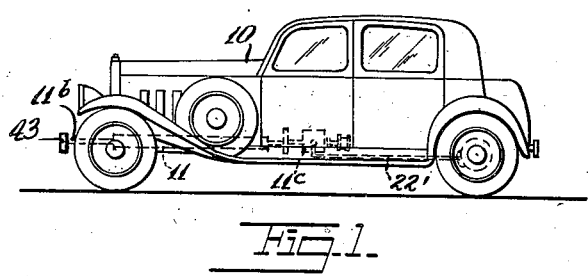
Fig. 1 is a side view of an automobile equipped with the safety device according to this invention.

In Fig. 1 an automobile 10 is illustrated provided with a plurality of feelers 11 arranged at different locations thereon. For example, these feelers extend from the front of the vehicle and are joined by a bumper 43. A camera 12 is associated with each of the feelers and is trained in a predetermined direction. Each of these feelers may have an end member such as a wheel 14 or bumper 43 on its extremity, which is adapted to be depressed when a foreign object is engaged to operate the device as hereinafter further described.

Figure 2:
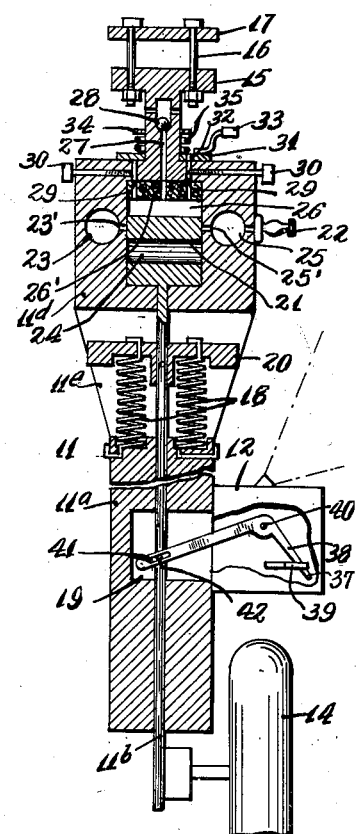
Fig. 2 is a fragmentary enlarged longitudinal sectional view of one of the feelers per se and a camera associated therewith.

In Fig. 2 a detail of one of the feelers is disclosed. This feeler, indicated broadly by the numeral 11, consists of a pair of telescopic members 11$^a$ and 11$^b$ arranged with the inner member 11$^b$ projecting from one end of the member 11$^a$. A means is provided for fixedly mounting the member 11$^a$ upon a vehicle or other device. This means comprises a bracket portion 15 associated with bolts 16 and a holding plate 17. A body portion 11$^d$ is integral with the bracket portion 15 and connects with a flange portion 11$^e$ which connects with the member 11$^a$. The holding plate may be engaged on one side of a frame element 5 of the airplane or other device, and the bolts 16 engaged therethrough.

A resilient means is provided for urging the inner member outwards so as to be depressible inwards when it strikes something. This resilient means comprises springs 18 which act between a flange 20 fixed on the member 11$^b$ and the member 11$^a$. A valve piston 21 is mounted on an inner hollow member 11$^c$ and controls a supply of compressed air to operate an acoustic device 22. There is a compressed air inlet 23 which is connected with a suitable supply of compressed air, not shown on the drawing, such a storage tank fed by an air compressor. The piston 21 has a passage 24 adapted to be connected with an inlet port 23' and with an outlet port 25' which is connected with an outlet 25. This outlet is provided with the acoustic device 22.

In the extended position of the member 11$^b$ the piston 21 is in the forward end of its operating chamber 26. The rear end of this chamber connects with a passage 27 connecting with a one way valve 28. This one way valve permits the air in this chamber 26 to readily escape but prevents atmospheric air from coming in. It acts as a dash pot to retard the return of the piston 21. Sponge screen 26' is placed in chamber 26.

In order to quicken the time it takes for the piston 21 to return to its normal position, several bypasses 29 are provided, which are controlled by needle valves 30. These bypasses may be selectively used by reason of a ring member 31 formed with a passage 32 and normally closing off all the bypasses 29 except one, the one with which the passage 32 aligns. A handle 33 is connected with the ring 31 by which it may be moved. A flange 34 is fixedly mounted on the member 11$^d$ and supports a spring 35 acting against the ring 31 to hold the ring in operative position.

The camera 12 is attached upon the side of the member 11$^a$ and has a conventional lever 39 which may be pivoted to snap the shutter thereof. A bell crank 38 is pivotally mounted by a pin 40 and has one end connected with the lever 39 and the other end is formed with a slot 41 engaged by a pin 42 carried by the member 11$^b$. The roller or wheel 14 is mounted upon the outer end of the member 11$^b$.

The operation of the device is as follows:—
When a foreign object engages the bumper or wheel 14 and depresses the member 11b the bell crank 38 will be pivoted to operate the camera which snaps a picture of the vicinity. Simultaneously, the piston valve 21 is moved into a position in which the compressed air from inlet 23 passes into the pipe 25 and then into the acoustic device 22 and sounds an alarm.

When the piston 21 moves upwards the air is forced out from the compartment 26. The return of this air is controlled by one of the needle valves 30—the needle valve in the bypass 29 which is aligned with the opening 32. As the air re-enters the compartment 26 the piston will be moved by the springs 18 and the compressed air cut off until the device is in the original position.

In operation, when the bumper 43 is depressed, the cameras will snap pictures. In place of the acoustic device, brake actuating pipes 22' may be connected to outlets 25 to apply pressure or friction at the usual wheel braking mechanism of the vehicle.

Figure 4:
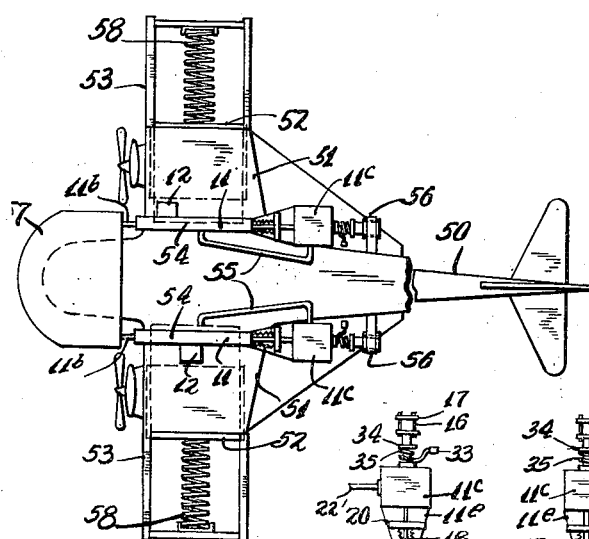
Fig. 4 is a plan view of an airplane with expandible wings according to this invention.
Figure 3:
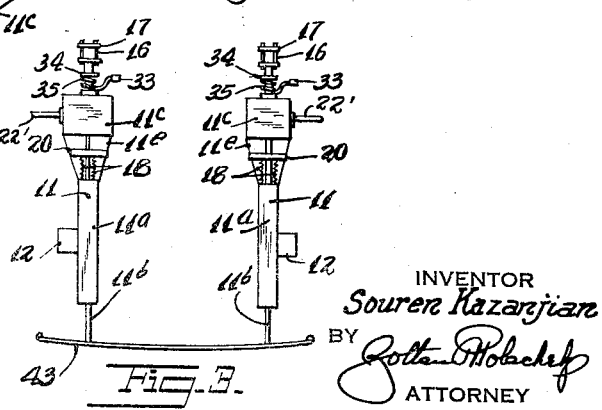
Fig. 3 is a plan view of a pair of the feelers supporting an automobile bumper.

In Fig. 4 a still further embodiment of the invention has been disclosed. It is shown applied to an airplane 50. This airplane has standard wings 51 in which extendable wing portions 52 are housed. These wing portions are extendable upon frames 53. These wing portions extend into cylinders 54 which are connected by pipes 55 discharging compressed air controlled by the feelers 11. These feelers 11 are mounted on brackets 56 mounted upon the fuselage of the airplane. At the front a shell-like member 57 is mounted upon the telescopic members 11b of the feelers. Springs 58 are mounted upon the frames 53 and urge the wing portions 52 into retracted positions.

When the shell-like member 57 is depressed due to air pressure of the airplane during flight, or other reasons, the telescopic members 11b will be moved inwards and operate the cameras 12 and simultaneously operate the compressed air supply as previously mentioned. This compressed air supply, in this form of the invention, is not used to operate the acoustic device, but instead is connected by the pipes 55 to the chambers 54 and causes the pneumatic extensions of the wings 52.

In place of compressed air, any suitable gas may be supplied through pipes 55, for extending and inflating the extendable wings 52.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention what I claim as new and desire to secure by United States Letters Patent is:

1. In a device of the class described feelers, each comprising a pair of telescopic members arranged with the inner one projecting from one end, means for fixedly mounting the outer of said members, resilient means urging said inner member outwards so as to be depressed when it strikes something, a valve piston on said inner member and controlling a supply of compressed air or the like to operate an auxiliary device, and a dash pot means for delaying said valve piston in returning to its original position when it is depressed, comprising a one way valve through which air or fluid may be forced, several needle control bypasses adjusted to various capacities arranged to permit the return of the air or fluid, and a means for rendering all of said bypasses inoperative except one.

2. In a device of the class described feelers, each comprising a pair of telescopic members arranged with the inner one projecting from one end, means for fixedly mounting the outer of said members, resilient means urging said inner member outwards so as to be depressed when it strikes something, a valve piston on said inner member and controlling a supply of compressed air or the like to operate an auxiliary device, and a dash pot means for delaying said valve piston in returning to its original position when it is depressed, comprising a one way valve through which air or fluid may be forced, several needle control bypasses adjusted to various capacities arranged to permit the return of the air or fluid, and a means for rendering all of said bypasses inoperative except one, including an annular member resiliently urged into position and having an opening alignable with said bleeds.

SOUREN KAZANJIAN.